(12) United States Patent
Sipila et al.

(10) Patent No.: US 7,039,407 B2
(45) Date of Patent: May 2, 2006

(54) METHOD AND SYSTEM FOR DETERMINING A VALUE OF A FIRST COUNTER OF A WIRELESS COMMUNICATION SYSTEM SERVING A USER STATION WHICH MOVES AT A TIME OF HANDOVER

(75) Inventors: Juha Sipila, Nokia (FI); Sture Gustafsson, Espoo (FI)

(73) Assignee: Nokia Corporation, Espoo (FI)

( * ) Notice: Subject to any disclaimer, the term of this patent is extended or adjusted under 35 U.S.C. 154(b) by 255 days.

(21) Appl. No.: 10/769,905

(22) Filed: Feb. 3, 2004

(65) Prior Publication Data

US 2005/0037759 A1    Feb. 17, 2005

Related U.S. Application Data

(60) Provisional application No. 60/494,809, filed on Aug. 14, 2003.

(51) Int. Cl.
*H04Q 7/20* (2006.01)

(52) U.S. Cl. .................. 455/436; 455/438; 455/439

(58) Field of Classification Search ................ 455/436, 455/438, 439
See application file for complete search history.

(56) References Cited

U.S. PATENT DOCUMENTS

2002/0025820 A1    2/2002    Fauconnier et al.

*Primary Examiner*—William D. Cumming
(74) *Attorney, Agent, or Firm*—Squire, Sanders & Dempsey LLP

(57) ABSTRACT

A method and system for determining the synchronized value of a first counter of a wireless communication system serving a user station which moves at a time of handover from a first coverage area controlled by a first controller into a second coverage area controlled by a second controller. A value of the first counter is maintained in the first controller up to the time of the handover. During handover a request is sent to the user station for a constant value representing the difference between the first counter and a second counter, the value of the second counter being maintained in the second coverage area. At a later time the second controller receives an updated value of the second counter and determines an updated value of the first counter at that later time using the constant value.

28 Claims, 5 Drawing Sheets

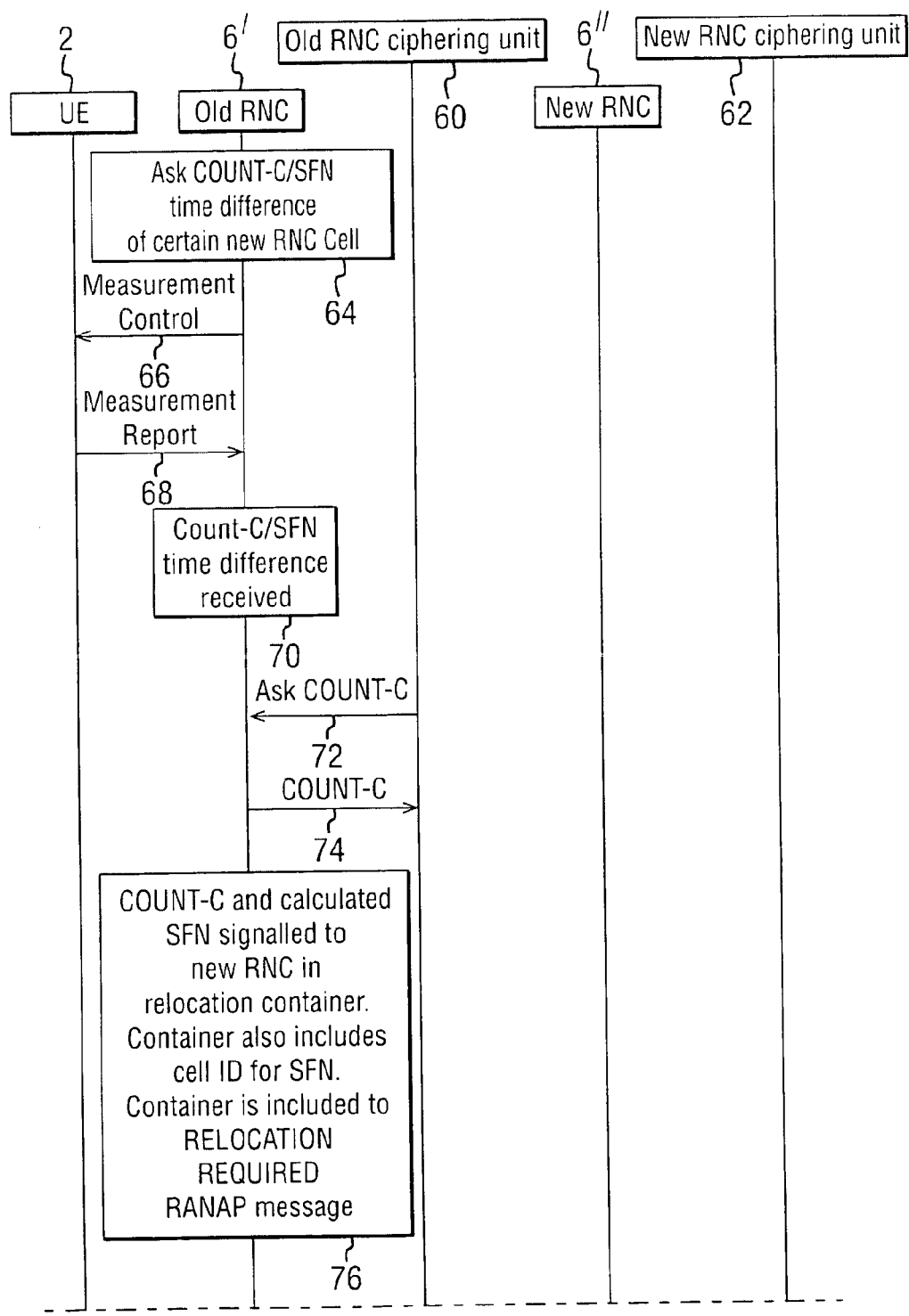

METHOD AND SYSTEM FOR DETERMINING A VALUE OF A FIRST COUNTER OF A WIRELESS COMMUNICATION SYSTEM SERVING A USER STATION WHICH MOVES AT A TIME OF HANDOVER

CROSS-REFERENCE TO RELATED APPLICATIONS

This application claims priority of U.S. Provisional Application Ser. No. 60/494,809 entitled "A Communication System," filed Aug. 14, 2003, the entire contents of which are incorporated herein by reference.

BACKGROUND OF THE INVENTION

1. Field of the Invention

The invention is concerned with a wireless communication system, and in particular but not exclusively with the synchronization of values during handover.

2. Description of the Related Art

A communication system can be seen as an environment that enables communication sessions between two or more entities such as user equipment and/or other nodes associated with the communication system. The communication may include, for example, communication of voice, data, multimedia and so on. A session may, for example, be a telephone call or multi-way conference session, or a communication session between a user equipment and an application server (AS), for example a service provider server. The establishment of these sessions generally enables a user to be provided with various services.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" which the communication can be based on needs to be defined to enable communication by the system.

Communication systems providing wireless communication for user equipment are known. An example of the wireless systems is the PLMN (Public Land Mobile Network). PLMNs are typically based on cellular technology. In cellular systems, a base transceiver station (BTS) or similar access entity serves wireless user equipment (UE) known also as mobile stations (MS) via a wireless interface between these entities. The communication on the wireless interface between the user equipment and the elements of the communication network can be based on an appropriate communication protocol. The operation of the base station apparatus and other apparatus required for the communication can be controlled by one or several control entities. The various control entities may be interconnected.

The field of wireless communications is evolving at a rapid pace. At present many applications are being developed for so-called third generation systems, for example UMTS (Universal Mobile Telecommunications System). System designers are also aware that most third generation systems have to be made compatible with second generation systems, for example GSM, and also with various other existing and emerging technologies, for example GPRS (General Packet Radio Service), EDGE (Enhanced Data for GSM Evolution), etc.

FIG. 1 shows a UTRAN (UMTS Terrestrial Radio Access Network) architecture having UE (User Equipment) 2 which transmits to and receives information from base stations indicated as Node B elements 4. Each Node B element 4 can have a plurality of cells, each cell being a RF coverage area provided by a transceiver. That is, each Node B element may consist of a plurality of transceivers each supplying their own cell coverage area. A plurality of Node B elements 4 are controlled by a RNC (Radio Network Controller) 6 and communicate over the so-called $I_{ub}$ interface. The RNC 6 is able to interface with the CN (Core Network) 8 over the so-called $I_u$ interface. The CN 8 contains for example elements such as a MSC (Mobile Switching Center), a SGSN (Serving General packet radio services Support Node), etc.

Broadly speaking, the portion of the UTRAN architecture indicated between the two horizontal dotted lines 10 and 12 is known as the RNS (Radio Network Sub-system). More specifically, each RNS is defined as containing a single RNC element 6, which is responsible for the resources and transmission/reception in a set of cells. That is, a single RNS is defined to contain a single RNC element 6 and all the node B elements 4 that it controls. In contrast multiple RNS's require multiple RNC's.

Consider an embodiment in which a typical mobile station takes the form of one of the UE elements 2 shown in FIG. 1, it can be appreciated that the mobile subscriber is able to roam throughout the network. In such a situation it can happen that all of the RF (Radio Frequency) links to the mobile station are controlled by another RNC, different to the RNC from where the call was started. In this situation there are two possibilities:

1) Traffic can be routed to the new RNC by signaling over the $I_{UR}$ interface that exists between different RNC elements, and in so doing the original connection through the old RNC (i.e. where the call was started) can be maintained.

2) The original connection is completely transferred to the new RNC (e.g., where the UE 2 has roamed), and in so doing the old radio links between the relevant UE and the old RNC are released.

The first possibility is known as a so-called "anchoring" approach, whereas the second possibility is known as a so-called "SRNS" (Serving Radio Network Sub-system) relocation.

Embodiments of the invention are primarily concerned with the second possibility (i.e. SRNS relocation), and include the techniques associated with so-called "inter RNC hard handover". An RNC is capable of assuming different roles. For example, during relocation a so-called "drift RNC" (DRNC) is present. The DRNC is not connected to the core network (i.e. has no $I_u$) interface and is used to support the radio resources of the UE during handover. The DRNC can be thought of as being similar to a temporary target RNC (without a link to the core network). That is, the DRNC is capable of supporting the radio link being relocated, i.e. between the UE and the new RNC responsible for controlling the cell to be handed over to of the relevant Node B element. For SRNS relocation there are already radio links between the DRNS and the UE before relocations starts, whereas for inter RNC hard handover there are none. The present invention is concerned with both situations.

Embodiments of the present invention are particularly concerned with the situation when a "ciphering" procedure is being used over the radio link. Broadly speaking, ciphering is used to maintain the security of radio bearer connections between the UE 2 and the RNS 6. The ciphering algorithm and its relevant parameters will be explained in more detail later herein.

At present, if an SRNS relocation is to be performed it is necessary for the UE to send new ciphering parameters to the new RNC. However, this causes a relatively long break in transmission over the radio bearer channels (i.e. needed to re-initialize the security afforded by a ciphering algorithm) and/or possibly result in unwanted noise components during transmission when relocation is eventually made.

An embodiment of the invention aims to synchronize a parameter during a relocation procedure and thereby overcome the aforementioned disadvantages.

SUMMARY OF THE INVENTION

According to one aspect of the invention there is provided a method for determining a value of a first counter of a wireless communication system serving a user station which moves at a time of handover from a first coverage area controlled by a first controller into a second coverage area controlled by a second controller. The method includes maintaining in the first controller, substantially until the time of the handover, the value of the first counter which is incremented periodically. The method further includes sending, at substantially the time of handover, a request to the user station for a constant value representing the difference between the first counter and a second counter. The value of the second counter is maintained in the second coverage area and is incremented periodically with the first counter. The method also includes receiving a value of the second counter at a later time at the second controller and determining the value of the first counter at that later time using the constant value.

Preferably, a first and a second set of bearer channels are used to transfer data between the user station and the corresponding first and second controller stations.

Additionally, the value of the first counter is preferably an input of a coding function for coding the data to be transferred over the first and second sets of bearer channels Preferably, the data is transferred according to a transparent RLC mode of operation.

According to another aspect of the invention there is provided a wireless communication system for serving a user station. The wireless communication system preferably includes a first station controller for controlling a first coverage area and a second station controller for controlling a second coverage area, wherein at a time of handover the user station moves from the first into the second coverage area. The first station controller has a first counter whose value is incremented periodically and substantially until the time of the handover. Furthermore, substantially at the time of handover, a request is sent to the user station for a constant value representing the difference between the first counter and a second counter. The value of the second counter is maintained in the second coverage area and is incremented periodically with the first counter. The second controller station receives a value of the second counter at a later time and determines the value of the first counter at that later time using the constant value.

According to yet a further aspect of the invention a method for determining a value of a first counter of a wireless communication system serving a user station which moves at a time of handover from a first coverage area controlled by a first controller into a second coverage area controlled by a second controller. The method includes maintaining in the first controller substantially until the time of the handover the value of the first counter which is incremented periodically; sending from the first controller at substantially the time of handover a request to the user station for a constant value representing the difference between the first counter and a second counter. The value of the second counter is maintained in the second coverage area and is incremented periodically with the first counter. The method further includes receiving at the first controller said constant value for determining the value of the second counter at substantially the time of handover and sending the values of the first and second counters at the time of handover to the second controller. Another step is receiving at the second controller at a later time, the values of the first and second counters from the first controller, the second controller also receiving a value of the second counter at the later time and determining from the received values the value of the first counter at that later time.

For a better understanding of the invention and to show how the same may be carried into effect, reference will now be made by way of example to the accompanying drawings.

DETAILED DESCRIPTION OF THE PREFERRED EMBODIMENTS

UMTS has been used as the example of a 3G system in the embodiments described hereinafter.

Figure 1:
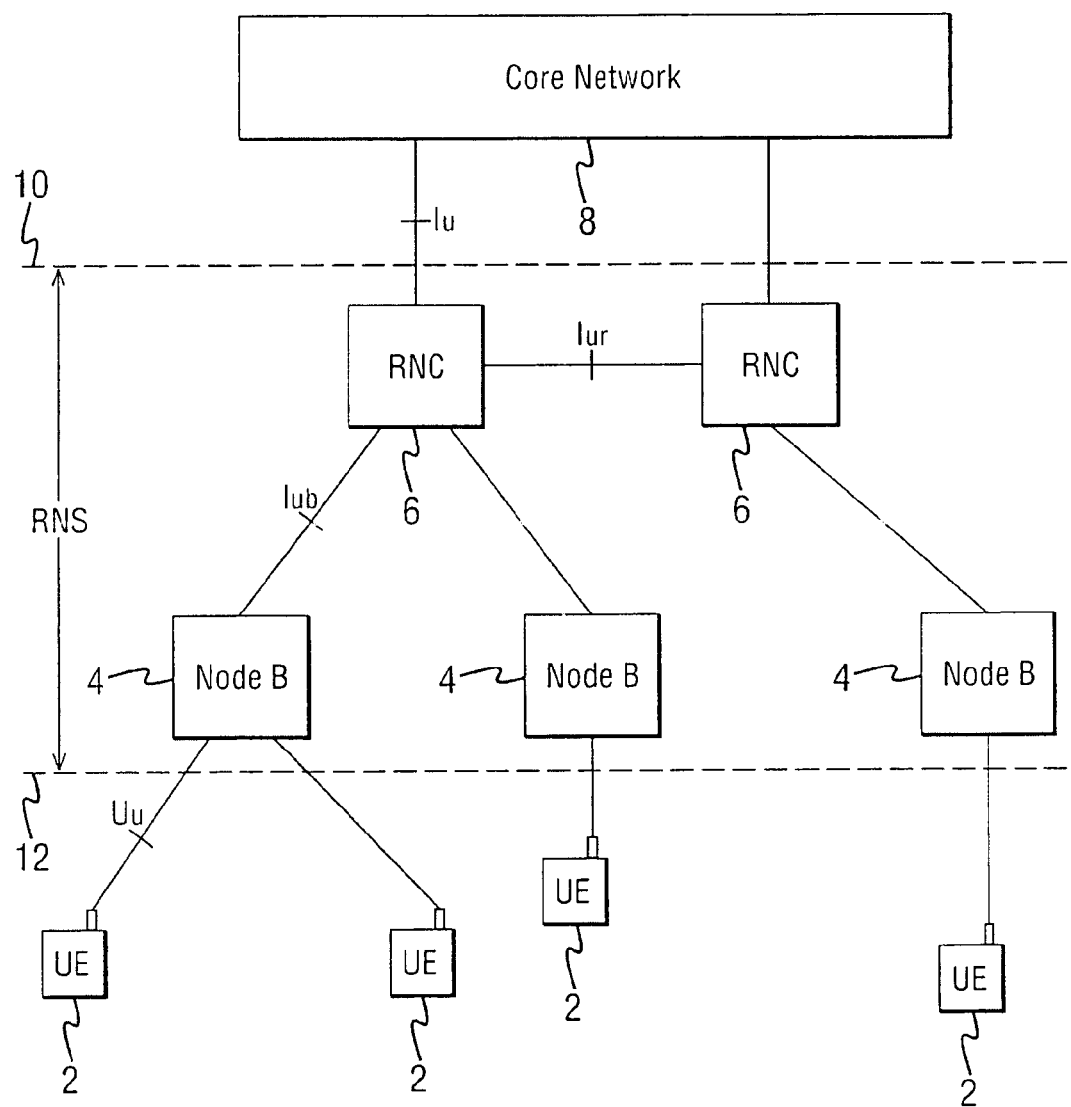
FIG. 1 shows a basic UTRAN network architecture in accordance with an embodiment of the invention.
Figure 2:
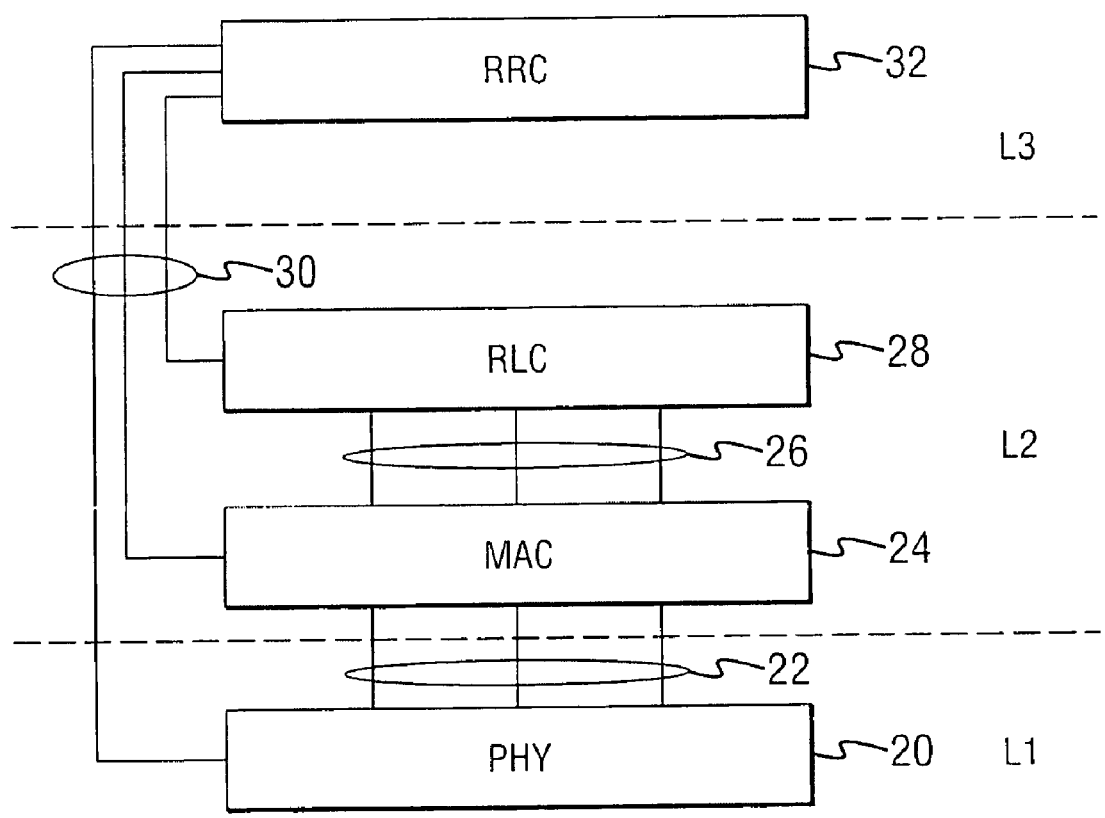
FIG. 2 shows layers of the radio interface protocol stack in accordance with an embodiment of the invention.

FIG. 2 shows the different levels of the UTRAN radio interface protocol architecture. In particular, at the lowest level (level L1), there exists the physical layer 20, just above that on the second level (i.e. level L2), there is a MAC (Media Active Control) layer, which communicates via transport channels 22 with the lower physical layer 20. Just above the MAC layer 24 resides the RLC (Radio Link Control) layer 28, which is also defined as being in level 2 and communicates through logic channel 26 with the lower MAC layer 24. At level L3 there exists a RRC (Radio Resource Control) layer, which is used to provide control signals 30 to and from the various underlying layers to control the relevant transport 22 and logical channel 26. The radio bearer channels consist of both logical channels and transport channels and can exist in either a user plane or a signaling plane. Moreover, radio bearer channels can exist in either an uplink direction (from the UE to the RNC) or a downlink direction (from the RNC to the UE).

Figure 3:
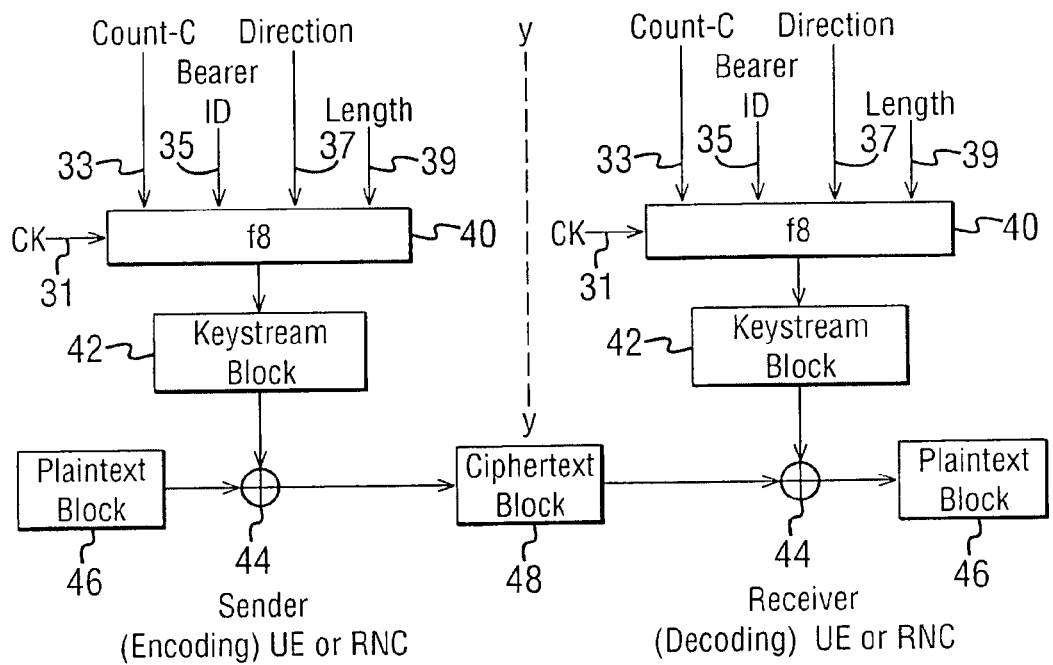
FIG. 3 shows an implementation of a ciphering algorithm in accordance with an embodiment of the invention.

FIG. 3 shows an example of a standardized ciphering model used to maintain the security and privacy for the radio bearer channels. This can be done using a standardized ciphering model which encodes data sent over the relevant radio bearer channels.

In this model the ciphering function is performed either in the RLC sub-layer or in the MAC sub-layer, according to the following rules:

If a radio bearer is using a non-transparent RLC mode, e.g., either an AM (Acknowledged) or UM (Unacknowledged) mode of operation, ciphering is performed in the RLC sub-layer 26; or If a radio bearer is using a TM (Transparent) RLC mode, ciphering is performed in the MAC sub-layer 24.

Ciphering is performed in the SRNC (Serving RNC) and the UE, and the parameters needed for ciphering are only known in SRNC and the UE.

FIG. 3 illustrates the use of the ciphering algorithm f8 40 to encrypt plaintext 46 by applying a keystream 42 using a bit per bit binary addition 44 (for example a XOR operation) of the plaintext 46 and the keystream 42. The plaintext may be recovered by generating the same keystream using the same input parameters and applying a bit per bit binary addition with the ciphertext.

The input parameters to the algorithm are the cipher key CK 31, a time dependent input COUNT-C 33, the bearer identity BEARER ID 35, the direction of transmission DIRECTION 37 and the length of the keystream required LENGTH 39. Based on these input parameters the algorithm generates the output keystream block KEYSTREAM 42 which is used to encrypt the input plaintext block PLAINTEXT 46 to produce the output ciphertext block CIPHERTEXT 48.

FIG. 3 is separated by a vertical line YY wherein the ciphering functionality on the left is for encoding during transmission (by either by the RNC or the UE) and the ciphering functionality on the right is for decoding during receiving (by either the RNC or the UE).

Therefore, it can be seen from FIG. 3 that the ciphering algorithm is radio bearer specific (i.e. dependent on radio bearer channels). Therefore, during a SRNS relocation these values need to be transferred from the old RNC to the new RNC. That is, when a particular UE roams from the old RNC to the new (target) RNC, the following ciphering parameters need to be transferred:

1) The ciphering key KC 31 which is typically 128 bits long and exchanged between the UE and the SRNC during the authentication phase.
2) The RADIO BEARER ID 33 which is a unique identifier of the relevant bearer or logical channel(s) used by a particular RRC connection. It is used to ensure that the same ciphering algorithm f8 is not applied to other bearer channels, which might have the same ciphering key KC or the same HFN. The radio bearer identifier BEARER is typically 5 bits long and wherein there is one BEARER ID parameter per radio bearer associated with the same user and multiplexed on a single 10 ms physical layer frame. The radio bearer identifier avoids an identical set of input parameter values being used for a different keystream 42.
3) The DIRECTION 37 which, in a preferred embodiment, is 1 bit long and identifies whether the keystreams are using the up-link or down-link. For example, the value of the DIRECTION is "0" for messages sent from the UE to the RNC and "1" for messages sent from the RNC to the UE.
4) The LENGTH 39 indicator which, in one embodiment, is 16 bits long, identifies the length of the required keystream block 42.
5) COUNT-C is a counter register composed of a "long" sequence number called a HFN (Hyper Frame Number) and a "short" sequence number which depends on the ciphering mode.

That is, data packets can be sent in at least three modes: i) a co-called RLC UM (Unacknowledged Mode) wherein the range of RLC sequence numbers is 7 bits and is represented by the short sequence number of the counter register to represent values between 0 and 127; ii) a so-called RLC AM (Acknowledged Mode) wherein the twelve least significant bits of the counter register are used to indicate the RLC sequence number having a value between 0 and 4096; iii) in a so-called RLC TM (Transparent Mode) there are no RLC sequence numbers used and therefore there is no "short" sequence and therefore in the TM mode of operation the HFN equals the value of the COUNT-C counter register, which, in one implementation, is incremented once in every 10 ms.

Embodiments of the invention are concerned with the TM mode of operation in which no additional protocol information is added to each PDU (Packet Data Unit).

Figure 4:
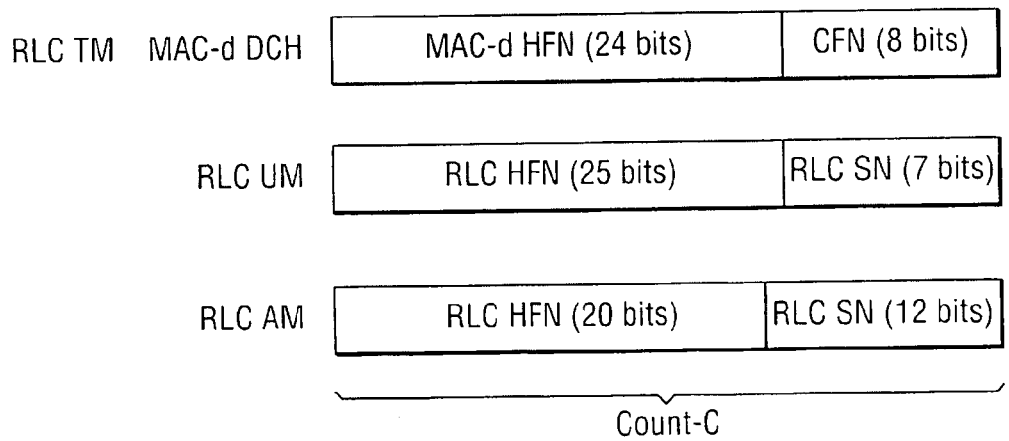
FIG. 4 shows a bit structure of the COUNT-C parameter for the three different RLC modes of operation.

FIG. 4 shows the bit structure of the COUNT-C register counter for all of the transmission modes in accordance with the 3GPP TS 33.102 V3.13.0 (2002-12) standards produced by the ETSI 3GPP. The top section of FIG. 4 is of particular interest to the described embodiments of the invention since it represents the bit structure of the COUNT-C for the TM mode of operation. The COUNT-C register is often referred to as the ciphering sequence number and is 32 bits long.

There is one COUNT-C value per up-link radio bearer and one COUNT-C value per down-link radio bearer using RLC AM or RLC UM. For all transparent mode RLC radio bearers of the same CN domain, COUNT-C is the same, and COUNT-C is preferably the same for the uplink and downlink directions. In UMTS the length of one radio frame is 10 ms. The COUNT-C value is also incremented once every radio frame, i.e. every 10 ms.

For the RLC TM mode of operation, the "short" sequence number of COUNT-C is the so-called 8-bit CFN (Connection Frame Number). It is independently maintained in the MAC layer 24 of the UE and the SRNC (Serving RNC). The "long" sequence number is the 24-bit HFN (Hyper Frame Number), which is also maintained in the MAC layer and is incremented at each CFN cycle.

A so-called SFN (System Frame Number) represents a 12-bit cell specific counter, which is also updated once every radio frame (i.e. every 10 ms). The SFN is incremented and maintained independently for each cell (i.e. within the corresponding transceiver(s) in the Node B element(s) 4), and is independent of the movement of the UE. The SFN is related to the COUNT-C by:

$$\text{last eight bits of the } SFN = \text{last eight bits of } COUNT-C + OFF$$
$$= CFN + OFF,$$

where OFF is a frame offset value.

The offset value OFF is a radio link specific L1 parameter used to map the CFN, used in the physical transport channel, into the SFN that defines the specific radio frame for the transmission on the air interface.

At the L1/L2 layer interaction, the mapping is performed as:

SFN mod 256=(CFN+OFF) mod 256 (from L2 to L1);
CFN=(SFN−OFF) mod 256 (from L1 to L2).

The resolution of all three parameters is 1 frame. The OFF and CFN have the same range (0 . . . 255) and only the 8 least significant bits of the SFN are used. The operations above are modulo 256. In the UTRAN, the offset OFF is calculated by the SRNC 6 and provided to the Node B element 4.

The HFN (or long sequence number of COUNT-C) is initialized, for example by means of a so-called "START"

value, which contains information to set the HFN. When a new radio bearer is created during a RRC connection in ciphered mode, the HFN is initialized by the START value. That is, the START value is signaled by the UE and includes a new value for the twenty most significant bits for all the HFN's of all the radio bearer channels. It is implemented when the so-called "activation time" expires. That is, the activation time is signaled to the SRNC by the UE within the same RRC message that contains the START value.

Ciphering presents special requirements during SRNS relocation, in that all of the relevant ciphering parameters necessary for security need to remain in synchronization so that the data flow in both the signaling and user planes of the radio access bearer channel(s) is not interrupted or corrupted. During SRNS relocation, the ciphering parameters preferably include length, ciphering key and radio bearer ID. Importantly, it should be noted that the whole value of the COUNT-C parameter also needs to be transferred for the described embodiment of the invention which is concerned with the TM of operation, whereas for the UM and AM modes of operation only the HFN value should be transferred.

One way of sending these parameters across is using a data structure often termed a "relocation container", which is included in one of the RANAP (Radio Access Network Application Part) messages. RANAP is the protocol used on the $I_U$ interface between a RNC element 6 and the CN 8. The container message is transmitted via the $I_u$ interface since the CN 8, especially the MSC and SGSN elements (not shown) within the CN, must also be made aware of the relocation to the new RNC.

Assuming a UE has roamed into a cell provided by one or more node B element(s) 4 controlled by a new RNC, it is necessary to transfer the synchronization information from the old RNC to the New RNC. Although the ciphering parameters are transferred to the new RNC in a relocation message, the COUNT-C parameter transferred will be outdated and therefore incorrect. The reason is because the COUNT-C parameter is incremented every 10 ms and so this parameter is updated at a far quicker rate than the time taken for the relocation signaling to occur. Therefore in the time taken for the relocation message to be sent, the COUNT-C parameter would have been incremented many times and would be outdated. It is therefore a requirement for the new RNC to synchronize to the correct value of COUNT-C.

According to an embodiment of the invention, this requirement is achieved using the so-called "MEASUREMENT REPORT" message, which contains an element "COUNT-C-SFN frame difference". This is advantageous over conventional cipher signaling in that the time period taken to synchronize during an SRNS relocation is reduced, which results in the shortest possible interrupt to the data. For example, the interruption to speech using a CS (Circuit Switched) connection, over the radio bearer channels is reduced.

Figure 5:
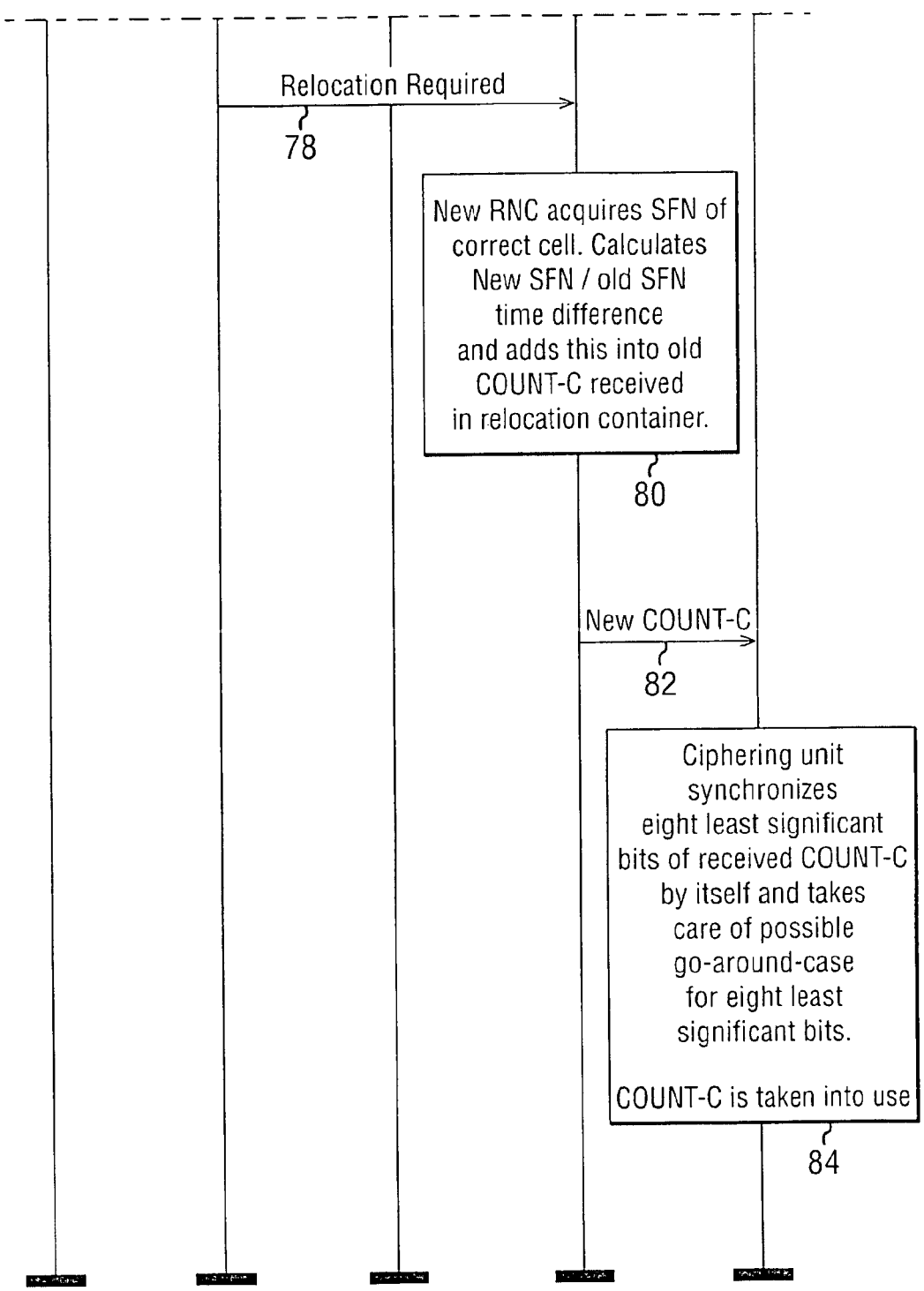
FIG. 5 shows a timing diagram according to a preferred embodiment of the invention.

The effect that the "MEASUREMENT REPORT" message has on the synchronization of the COUNT-C parameter in the new RNC is now described in relation to FIG. 5, which shows a timing diagram according to a preferred embodiment showing the events for performing synchronization of the ciphering parameters.

Firstly it is assumed that in the RLC TM mode of operation, the values of COUNT-C and SFN of the measured cell are updated concurrently, e.g., every 10 ms. So the difference between the twelve least significant bits of the COUNT-C value maintained in the relevant UE and in the RNC, and the SFN maintained in the measured cell are always constant.

In one implementation of the invention, the data of the element "COUNT-C-SFN frame difference" is used to calculate a constant time difference, which is sent to the new RNC for determining the synchronized COUNT-C value.

During handover, a handover unit (not shown) will determine which is the "best" cell to hand over to according to some criterion, for example the cell having the highest transmitter power. So initially, at step 64, the system becomes aware that the relevant UE has roamed into a best cell controlled by a new RNC and therefore an SRNC relocation needs to be initiated. At step 66, the old RNC determines the best cell to be handed over to and informs the UE of the cell ID of the best cell using the MEASUREMENT CONTROL message. The MEAUREMENT CONTROL message sent from the old RNC 6' to the relevant UE 2 also contains a request for the "COUNT-C-SFN frame difference" value to be calculated by the UE for the best cell.

At step 68, the UE returns the calculated frame difference value to the old RNC 6' using a "MEASUREMENT REPORT" message, which is already defined in the standards. More specifically, synchronization is achieved using an IE (Information Element) known as "cell synchronization information", which is sent within the "MEASUREMENT REPORT" message by the UE 2. The IE "cell synchronization information" contains the "COUNT-C-SFN frame difference" value, which in turn consists of the elements "COUNT-C-SFN high" and an offset element "OFF" as defined before.

At step 70 the frame difference value is received by the handover unit (not shown) of the old RNC. At step 72, the old RNC 6' requests the value of COUNT-C from the MAC layer 24 in the ciphering unit 60, whose functionality in a preferred embodiment is located within the old RNC itself 6'. At step 74, the COUNT-C value of the old RNC is returned.

At step 76, the old RNC is then able to calculate the SFNold of the best cell at the instant in time when the COUNT-C value was retrieved using equation (1):

$$SFNold=((INT[COUNT\text{-}C/256]+COUNT\text{-}C\text{-}SFN \text{ high}) \bmod 16)*256+(COUNT\text{-}C+OFF) \bmod 256 \quad (1)$$

where "INT" is the integer part of the division operation and "mod" is modulo arithmetic.

The eight least significant bits of the SFN are the eight least significant bits of the sum: (COUNT-C+OFF); and the four most significant bits of SFN are the four most significant bits of the sum (COUNT-C+COUNT-C-SFN high).

At step 78, a container message "RELOCATION REQUIRED" is sent using the standardized RANAP protocol via the CN 8 to the new RNC, wherein the container message includes: the calculated SFNold value, the cell Id of the best cell and the COUNT-C value of the old RNC 6. These parameters are signaled to the new RNC 6", which in turn creates and starts a new ciphering unit 62.

At step 80, the up to date SFN referred to as the SFNnew value can be determined from the PCH (Paging Channel) of the best cell identified in the container message. That is, the best cell is the target cell to be handed over to and the cell ID of this cell is received in the container message. From this cell ID, the new RNC 6" knows from which cell the relevant SFN (maintained in the relevant Node B element 4) is to be retrieved. The PCH is cell specific and because the full 12-bit SFN is required for paging channel synchronization, and the complete SFN value is available substantially immediately.

The new RNC 6″ is now able to calculate the time difference between the SFNnew and the SFNold and add this to the old COUNT-C value to determine to what degree the frame difference is unsynchronized and thereby obtains a rough estimate as to what the new COUNT-C value should be, for example using equation (2):

$$\text{COUNT-C new} = \text{COUNT-C old} + (SFN\text{new} - SFN\text{old}) \quad (2)$$

At step 82, the new COUNT-C value is then signaled to the new ciphering unit 62, and at step 84 the new ciphering unit performs a fine-tuning function. This is possible since at any time the ciphering unit 62 knows the status of the eight least significant bits of the COUNT-C value. The actual new COUNT-C value is now calculated by taking these right least significant bits and the twenty-four most significant bits of the new COUNT-C value. That is, the ciphering unit 62 compares its own eight least significant bits with the eight least significant bits of the calculated new COUNT-C value, and if the ciphering unit's own value is less than in the new COUNT-C value, the bits have "gone round" (i.e. shifted a cycle) and it is necessary to add a value of $2^8=256$ to the COUNT-C value, which will give the finely tuned real COUNT-C value.

In an alternative embodiment, the "COUNT-C-SFN frame difference" constant value received in the MEASUREMENT RESPONSE message can be forwarded directly in the container message to the new RNC 6″. That is, step 76 of the timing diagram shown in FIG. 5 is altered slightly in that SFNold value is not calculated at the old RNC 6'. Instead, the container message sent within the RELOCATION REQUIRED message 78 includes the COUNT-C value, the constant value and the cell ID of the best cell. That is the constant frame difference value is merely forwarded on by the old RN 6' to the new RNC 6″. Therefore, in an alternative embodiment the step of calculating the SFNold value is instead performed during step 80 at the new RNC 6″ using equation (1).

However, it should be appreciated that in the foregoing embodiments the frame difference value is a constant value which is used to determine the updated COUNT-C value in the new RNC 6″.

It should be appreciated that there may be other criteria for determining the best cell to handover. For example, the cell with the highest reception power, or the lowest SNR, etc.

It should also be appreciated that whereas the term "register" has been used throughout the description, this might be implemented in hardware, for example in silicon using an integrated circuit, or equally in software for example as a computer variable.

Lastly, it should be appreciated that whereas the aforementioned embodiments have been described in relation to the UTRAN architecture, the invention works equally well for other 3G (third generation) elements. Therefore the UE, Node B and RNC elements could be interchangeable with any other elements that might solve the same problems as the invention.

The invention claimed is:

1. A method for determining a value of a first counter of a wireless communication system serving a user station which moves at a time of handover from a first coverage area controlled by a first controller into a second coverage area controlled by a second controller, the method comprising:

maintaining in the first controller, substantially until the time of the handover, the value of the first counter which is incremented periodically, sending, at substantially the time of handover, a request to the user station for a constant value representing a difference between the value of the first counter and a value of a second counter, the value of the second counter being maintained in the second coverage area and incremented periodically with the first counter; and receiving an updated value of the second counter at a later time at the second controller and determining an updated value of the first counter at that later time based on the constant value, the value of the first counter at the time of handover and the value of the second counter at the later time.

2. The method according to any claim 1, wherein the first controller receives the constant value and sends a container message to the second controller comprising the constant value and an identifier indicating the second coverage area.

3. The method according to claim 1, wherein the first controller receives the constant value, determines the value of the second counter substantially at the time of handover based on the constant value, and sends a container message comprising the value of the second counter substantially at the time of handover to the second controller.

4. The method according to claim 3 wherein the container message further comprises the values of the first counter substantially at the time of handover and an identifier indicating the second coverage area.

5. The method according to claim 4, wherein the second controller receives over a paging channel from the identified second coverage area, the updated value of the second counter at the later time.

6. The method according to claim 1, wherein a first and a second set of bearer channels are used to transfer data between the user station and the corresponding first and second controller stations.

7. The method according to claim 6, wherein the updated value of the first counter is an input of a coding function for coding the data to be transferred over the first and second sets of bearer channels.

8. The method according to claim 6, wherein the data is transferred according to a transparent radio link control mode of operation.

9. The method according to claim 7, wherein the coding function further comprises at least one of the following inputs: a ciphering key, a length indicator, a direction indicator and a bearer channel identifier.

10. The method according to claim 1, wherein the value of the first counter is a COUNT-C value.

11. The method according to claim 1, wherein the first counter has thirty-two bits of which twenty-four most significant bits represent a hyper frame number (HFN) value and eight least significant bits represent a connection frame number (CFN) value.

12. The method according to claim 11, further comprising a checking step performed by comparing the CFN value of the first counter determined at the later time with an actual CFN value maintained independently in the second controller, wherein if the compared values are different, a predetermined value is added to the value of the first counter determined at the later time.

13. The method according to claim 11, wherein the second counter has 12 bits representing a system frame number (SFN) value.

14. The method according to claim 13, wherein the SFN value is equivalent to the CFN value plus an offset value.

15. The method according to claim 1, wherein each of the first and second controllers has at least one base station, each base station having at least one transceiver arranged to provide the corresponding coverage area.

16. The method according to claim 15, wherein a first transceiver in a first base station provides the first coverage area and a second transceiver in a second base station provides the second coverage area, the first and second base stations being controlled by the corresponding first and second controllers.

17. The method according to claim 1, wherein the first controller sends a measurement control message to the user station comprising the request for the constant value, and wherein the user station responds with a measurement report message comprising the constant value.

18. A wireless communication system for serving a user station, the wireless communication system comprising:
   a first controller for controlling a first coverage area and a second controller for controlling a second coverage area, wherein at a time of handover the user station moves from the first into the second coverage area;
   the first controller having a first counter whose value is incremented periodically substantially until the time of handover, and wherein substantially at the time of handover a request is sent to the user station for a constant value representing a difference between the first counter and a second counter, wherein a value of the second counter is maintained in the second coverage area and is incremented periodically with the first counter; and
   the second controller receiving an updated value of the second counter at a later time and determining the value of an updated first counter at that later time based on the constant value, the value of the first counter at the time of handover and the value of the second counter at the later time.

19. The system according to claim 18, wherein each of the first and second controllers include a ciphering unit arranged to receive the updated value of the first counter as an input for coding data to be transferred between the user station and the corresponding first and second controllers.

20. The system according to claim 19, wherein the first controller includes a handover unit arranged to determine which of the first and second coverage area is the best for handover.

21. The system according to claim 20, wherein the best coverage area is an area having a greatest transmitted power value.

22. The system according to claim 18, wherein the wireless communication system is a UMTS system, wherein the user station is user equipment, wherein the first and second controllers are radio network controllers and wherein the system further includes base stations which are Node B elements.

23. A method for determining a value of a first counter of a wireless communication system serving a user station which moves at a time of handover from a first coverage area controlled by a first controller into a second coverage area controlled by a second controller, the method comprising:
   maintaining in the first controller substantially until the time of the handover the value of the first counter which is incremented periodically;
   sending from the first controller, at substantially the time of handover, a request to the user station for a constant value representing a difference between the value of the first counter and a value of a second counter, the value of the second counter being maintained in the second coverage area and incremented periodically with the first counter;
   receiving at the first controller said constant value for determining the value of the second counter at substantially the time of handover and sending said values of the first and second counters at the time of handover to the second controller; and
   receiving at the second controller at a later time said values of the first and second counters from the first controller, the second controller also receiving an updated value of the second counter at the later time and determining from the received values an updated value of the first counter at that later time.

24. A method of determining the value of a first counter for handover, the value of the first counter being for encoding data transferred between a user station and a first base station controlled by a first controller and, for encoding data transferred between the user station and a second base station controlled by a second controller, the method comprising the steps of:
   a) sending from the user station to the first controller a constant value representing the difference between the value of the first counter and the value of a second counter;
   b) identifying at the first controller the value of the first counter before handover;
   c) calculating at the first controller the value of the second counter before handover based on said identified value of the first counter and the constant value, and sending said calculated value of the second counter to the second controller;
   d) identifying at the second controller the latest value of the second counter upon receiving the calculated value of the second counter; and
   e) calculating at the second controller the latest value of the first counter based on the identified value of the first counter before handover, the calculated value of the second counter before handover and the latest value of the second counter.

25. The method according to claim 24, wherein for step d) the second controller receives an identity of the second coverage area and determines over a paging channel the updated value of the second counter at the later time.

26. The method according to claim 24, wherein for step e) the second controller calculates the latest value of the first counter by finding the difference between the value of the second counter before handover and the latest value of the second counter, and adding the difference to the value of the first counter before handover.

27. The method according to claim 24, wherein the values of the first and second counters being periodically incremented concurrently every 10 ms.

28. A method of determining the value of a first counter for handover, the value of the first counter is for encoding data transferred between a user station and a first base station controlled by a first controller and, for encoding data transferred between the user station and a second base station controlled by a second controller, the method comprising the steps of:
   a) sending from the user station to the first controller a constant value representing the difference between the value of the first counter and the value of a second counter;
   b) identifying at the first controller the value of the first counter before handover;

c) sending to the second controller the constant value and the value of the second counter before handover;
d) upon receiving said values, identifying the latest value of the second counter; and
e) calculating at the second controller the latest value of the first counter based on the identified value of the first counter before handover, the calculated value of the second counter before handover and the latest value of the second counter.

* * * * *